Figure 1:
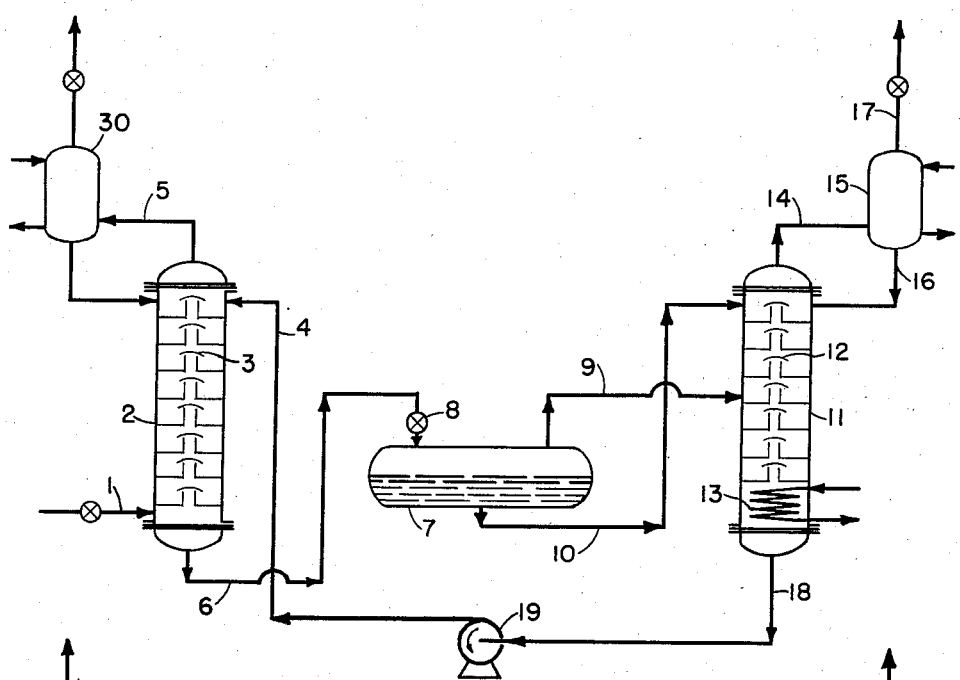

May 12, 1959 H. E. BENSON ET AL 2,886,405
METHOD FOR SEPARATING CO₂ AND H₂S FROM GAS MIXTURES
Filed Feb. 24, 1956 4 Sheets-Sheet 1

INVENTORS
Homer E. Benson
Joseph H. Field
BY
ATTORNEY

May 12, 1959 H. E. BENSON ET AL 2,886,405
METHOD FOR SEPARATING CO$_2$ AND H$_2$S FROM GAS MIXTURES
Filed Feb. 24, 1956 4 Sheets-Sheet 3

INVENTORS
Homer E. Benson
Joseph H. Field
BY
ATTORNEY

May 12, 1959  H. E. BENSON ET AL  2,886,405
METHOD FOR SEPARATING CO$_2$ AND H$_2$S FROM GAS MIXTURES
Filed Feb. 24, 1956  4 Sheets-Sheet 4

INVENTORS
Homer E. Benson
Joseph H. Field
BY
ATTORNEY

United States Patent Office 2,886,405
Patented May 12, 1959

2,886,405
METHOD FOR SEPARATING CO₂ AND H₂S FROM GAS MIXTURES

Homer Edwin Benson and Joseph H. Field, Pittsburgh, Pa., assignors to the United States of America as represented by the Secretary of the Interior Application February 24, 1956, Serial No. 567,692

18 Claims. (Cl. 23—3)

(Granted under Title 35, U.S. Code (1952), sec. 266)

The invention herein described and claimed may be manufactured and used by or for the Government of the United States of America for governmental purposes without the payment of royalties thereon or therefor.

This invention is concerned with an improved method for removing carbon dioxide and hydrogen sulfide from gas mixtures containing either or both of these slightly acidic gases. This application is a continuation-in-part of our copending application Serial No. 277,894, filed March 21, 1952, and now abandoned.

At the present time, a number of important industrial processes require the removal of large quantities of hydrogen sulfide and carbon dioxide from gas mixtures in which they occur. For example, in the gasification of coal in conventional water gas generators, or in other types of generators, to produce "city gas" or synthesis gas for such syntheses as the ammonia synthesis, the methanol synthesis, the Fischer-Tropsch synthesis, and the so-called "Oxo" synthesis, large quantities of carbon dioxide and hydrogen sulfide must be removed from the raw gas before it is suitable for use. Likewise, in the production of hydrogen from coal or natural gas, large quantities of CO₂ formed by the water gas shift reaction must be removed. In the Fischer-Tropsch process itself, substantial quantities of carbon dioxide are produced as a synthesis byproduct, and must be removed from the synthesis tail gas to obtain optimum utilization of the fresh gas feed.

According to the usual commercial practice at the present time, carbon dioxide and hydrogen sulfide are removed by absorbing these gases in aqueous solutions of alkaline reagents such as potassium carbonate and ethanolamine. Aqueous solutions of ethanolamines, particularly monoethanolamine and diethanolamine, are used most widely today as scrubbing agents for removal of these gases. Potassium carbonate solutions are also employed in a few commercial installations.

As practiced at the present time, scrubbing processes of this type involve an absorption stage conducted at approximately atmospheric temperature, and a regeneration stage in which the fouled solution is heated at its boiling point to drive off the absorbed gases. Since absorption takes place at relatively low temperatures and regeneration at relatively high temperatures, and since the solution is constantly circulated between the two stages, it is necessary to alternately heat and cool the solution over a relatively large range of temperatures. Even with efficient heat exchange equipment, it is not possible in this type of operation to avoid serious heat losses between the absorption and regeneration stages. Although it is possible to preheat the cold stream from the absorption stage to within about 40° to 50° F. of the temperature required in the regeneration stage by heat exchange with the hot regenerated solution leaving the regeneration stage, a closer temperature approach than this is not economical since the cost of the heat exchange equipment becomes prohibitively high. As a consequence, additional heat must be continuously supplied in the regeneration stage, usually in the form of steam to make up this loss in sensible heat. Furthermore, since the regenerated solution, as it comes from the heat exchanger, is usually not sufficiently low in temperature, additional cooling of this stream, requiring large quantities of cooling water, is usually necessary before it is introduced into the absorber column.

Because of the high heat losses inherent in this type of process, energy requirements, in the form of steam costs, amount to about 80% of the total cost of scrubbing CO₂ and/or H₂S from a gas mixture containing these gases. It is apparent therefore, that if it is possible to decrease the energy requirements of this process to any substantial amount, very important savings could be made in the over-all cost of the operation.

It is the principal object of the present invention to provide an improved process of the general type discussed above which makes possible a substantial reduction in the amount of energy required to remove a given amount of carbon dioxide and/or hydrogen sulfide from a gas mixture containing either or both of these gases.

It is another important object of the invention to provide a process for removing CO₂ and/or H₂S in which the usual heat exchange equipment, which ordinarily represents the major equipment cost for the entire installation, is completely eliminated.

According to our invention absorption takes place at a superatmospheric pressure preferably of at least 100 lbs./in.² gage, while the regeneration of the solution is carried out by boiling and steam stripping at a substantially lower pressure which may vary from somewhat below to somewhat above atmospheric pressure. The absorption and the regeneration stages are carried out at substantially the same temperature; that is, there is substantially no cooling, or only a small amount of cooling, of the regenerated solution as it leaves the boiling and steam stripping operation for recycle to the absorber. The regenerated solution accordingly enters the absorber at a temperature which is equal to or only slightly less than the temperature of the regenerated solution; viz., a temperature ranging from somewhat below to somewhat above the solution's atmospheric pressure boiling temperature. Under this combination of conditions, which will be set out in more detail in the description which follows, outstanding thermal efficiencies are obtained, while at the same time the capital cost of the necessary equipment is considerably reduced in contrast to conventional processes by the elimination of the usual inter-stage countercurrent heat exchanger.

Generally speaking, most of the alkaline scrubbing solutions commonly employed for CO₂ and H₂S removal are operable in the process of the invention. In particular, the invention includes the use of relatively concentrated solutions of alkali metal carbonates, such as potassium and sodium carbonate, alkali metal phosphates, such as potassium phosphate, and alkanolamines, particularly monoethanolamine and diethanolamine. As will be pointed out in detail subsequently, the greatest advantage is obtained by employing concentrated solutions of potassium carbonate, and it is to be understood consequently, that the use of potassium carbonate solutions represents the preferred embodiment of the invention.

Figure 7:
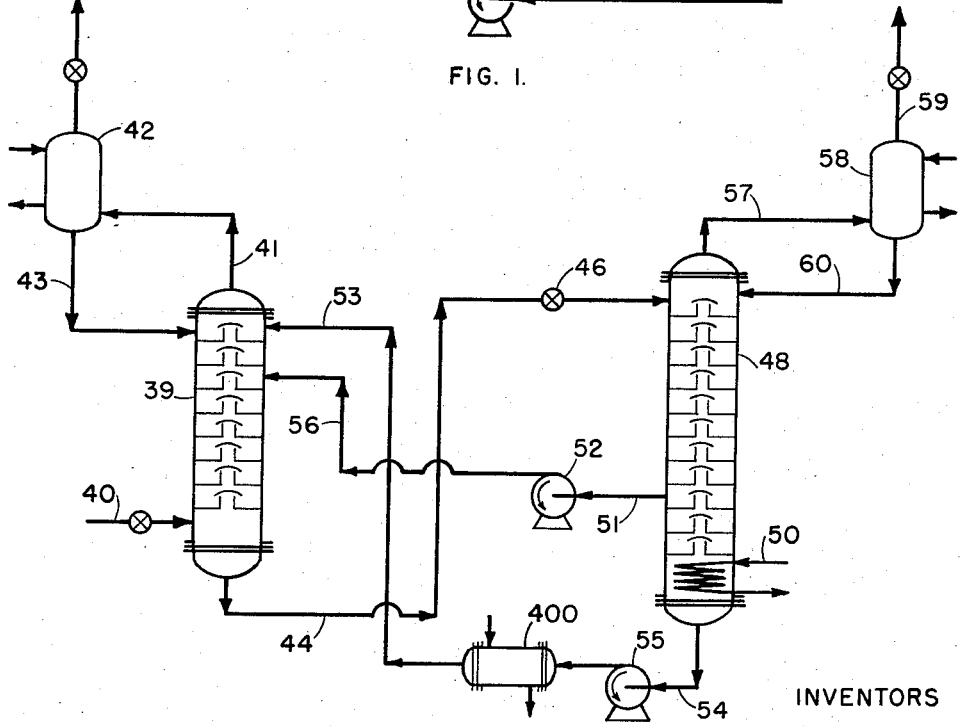
Figure 2:
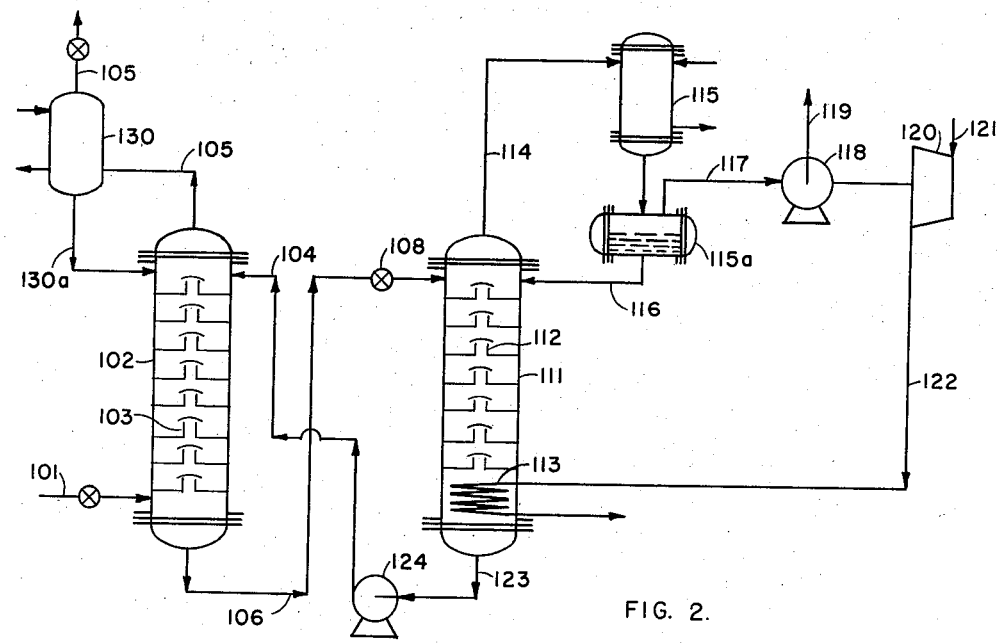
Figure 3:
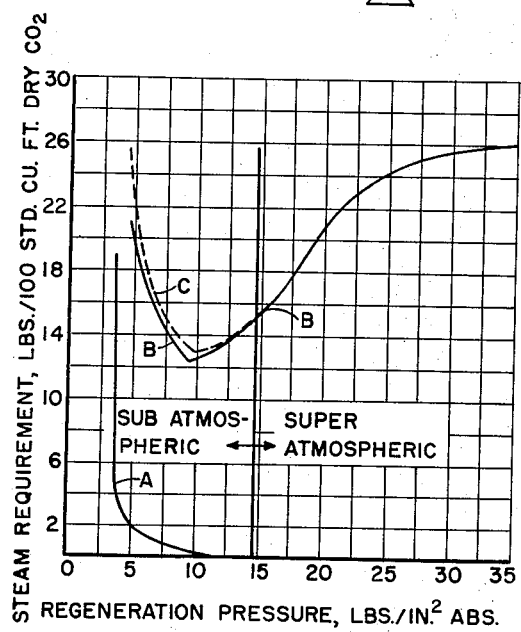
Figure 4:
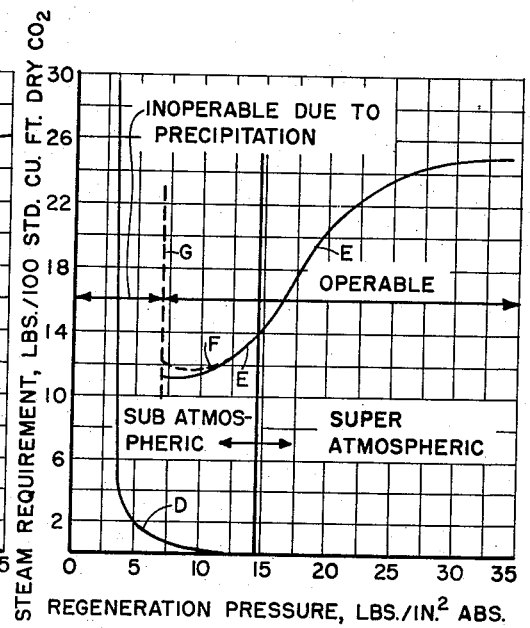
Figure 9:
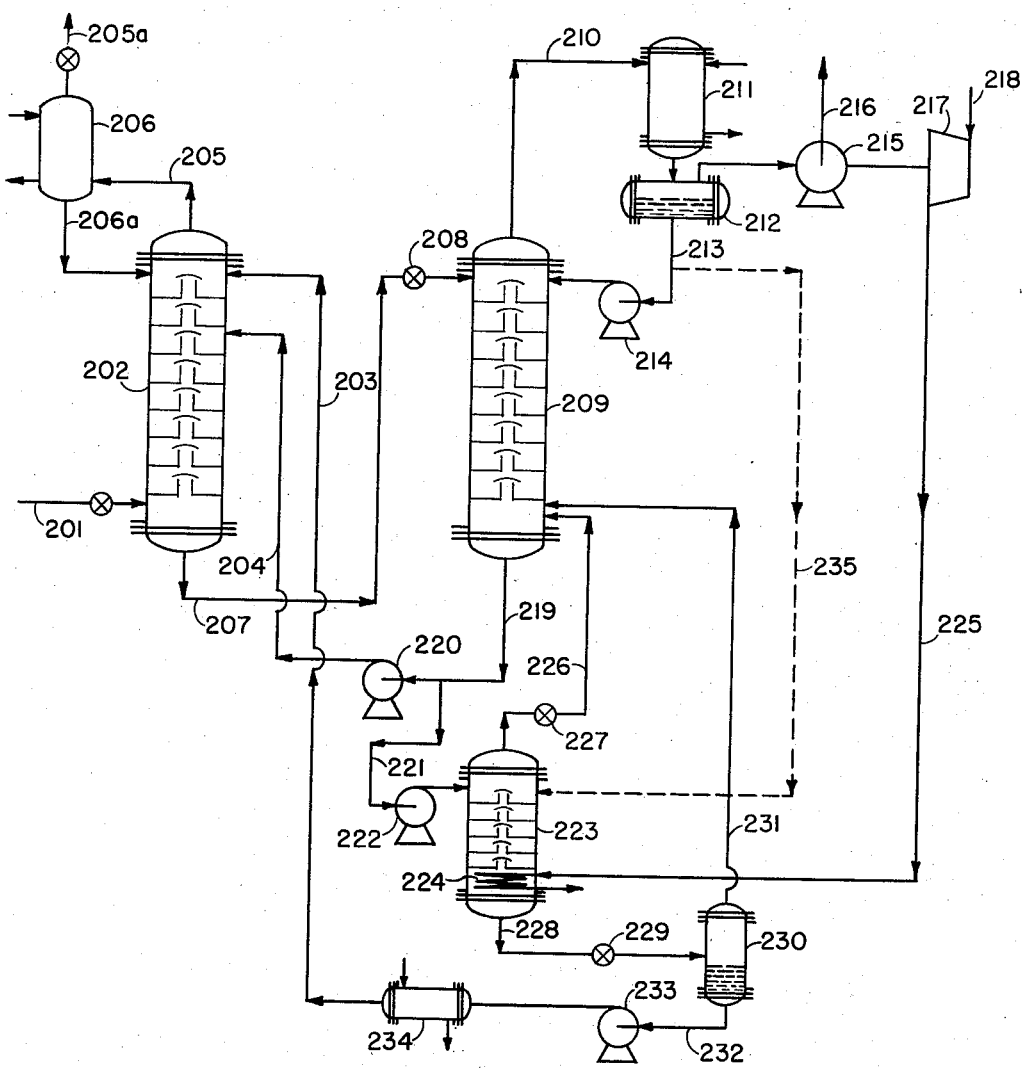
Figure 5:
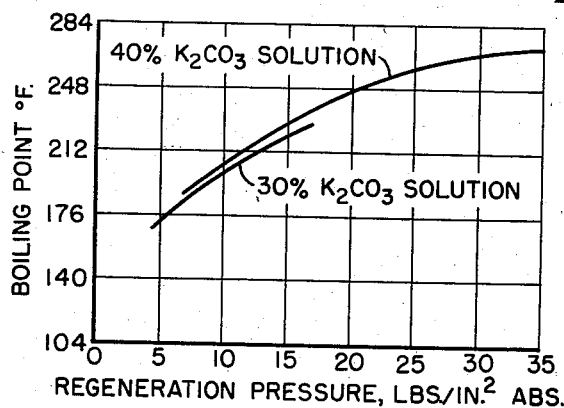
Figure 8:
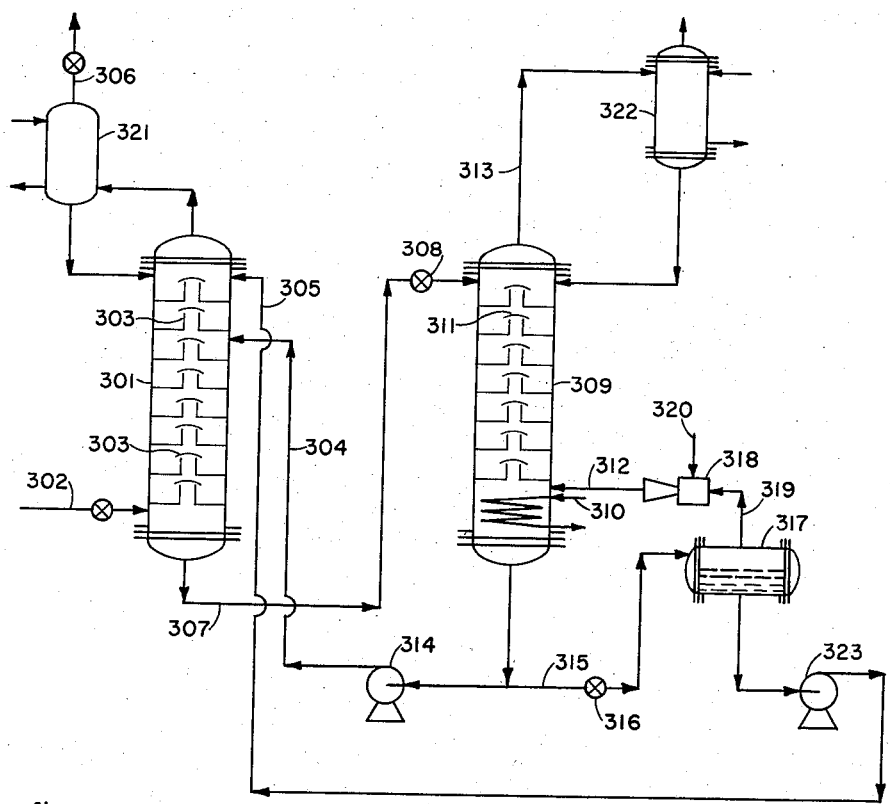
Figure 6:
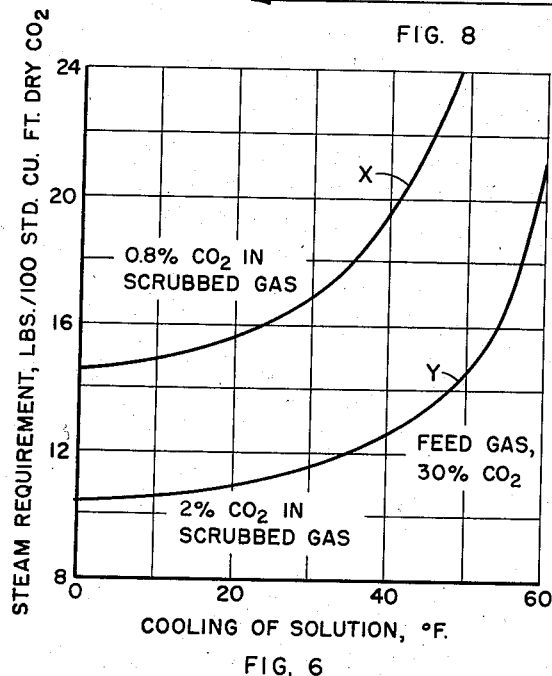

For a better understanding of the invention, reference is now made to the accompanying drawings wherein Fig. 1 is a flow diagram which illustrates a relatively simple form of the invention; and, Fig. 2 is a flow diagram which illustrates a modification of the invention in which the stripping operation is carried out at pressures somewhat below atmospheric; and, Fig. 3 is a graph showing the effect of pressure in the regenerator column on the regeneration steam requirements for a 30% K₂CO₃ solution; and, Fig. 4 is a similar graph showing the effect of pressure in the regenerator column on the regeneration steam requirements for a 40% $K_2CO_3$ solution; and, Fig. 5 is a graph showing the boiling points of a 30% (5.6 N) and 40% (8.2 N) aqueous $K_2CO_3$ solution at varying pressures; and, Fig. 6 is a graph showing the effect of cooling the scrubbing solution as it passes from the regenerator to the absorber on the total regeneration steam requirements; and, Fig. 7 is a flow diagram which illustrates a modification of the invention; and, Fig. 8 is a flow diagram which illustrates another modification of the invention; and, Fig. 9 is a flow diagram illustrating still another embodiment of the invention.

Fig. 1 illustrates a simple form of the invention in which the regenerator column, where boiling and steam stripping is carried out to regenerate the solution, is maintained at atmospheric or slightly greater than atmospheric pressure.

Referring now to Fig. 1, the gas stream from which carbon dioxide and/or hydrogen sulfide is to be removed is introduced by line 1 into the bottom of the absorber column 2. The absorber 2 may be any suitable type of countercurrent scrubbing tower capable of producing intimate contact between the scrubbing liquor and the gas mixture. For example, the absorber column may be equipped with bubble caps 3, as indicated in the drawing, or it may be supplied with a suitable packing such as Raschig rings or berl saddles. Column 2 is maintained under a superatmospheric pressure of at least 50 lbs./sq. in. gage and preferably at least 100 lbs./sq. in. gage, and the gas mixture supplied through line 1 must, of course, be at column pressure.

Elevated pressures are necessary in the absorber for two reasons: First of all, to insure relatively high partial pressures of carbon dioxide and/or hydrogen sulfide in the gas mixtures. Since absorption is carried out at approximately the same temperature as that at which the solution is regenerated, the equilibrium partial pressure of carbon dioxide and hydrogen sulfide over the solution is relatively high, and consequently absorption is not possible unless the partial pressure of these gases in the incoming gas stream is also relatively high. Unless the partial pressure of $CO_2$ or $H_2S$ in the incoming gas is greater than the equilibrium partial pressure of $CO_2$ or $H_2S$ above the solution leaving the bottom of the absorption column, no absorption can take place. The partial pressure of the gas to be scrubbed is proportional to its percentage concentration in the gas mixture and to the total pressure under which the gas mixture is maintained. Accordingly, it is apparent that the higher the total pressure under which the absorber is operated, the higher will be the initial partial pressure of the gas to be removed, and consequently the more efficiently this gas can be scrubbed out.

The second reason why elevated pressures are required in the process of the invention is to minimize losses due to vaporization of the solution in the absorption column. Since absorption is carried out at temperatures in the vicinity of the atmospheric boiling temperature of the solution, at pressures below about 50 pounds per square inch, excessive volatilization of the solution would occur with attendant heat losses.

The optimum pressure from an economic standpoint which is to be maintained in the absorption zone will be fixed by a number of considerations, including the value to which it is desired to reduce the percentage concentration of the gas to be removed, whether the initial gas mixture is available under pressure, and whether or not the purified gas stream itself is to be utilized under elevated pressure conditions. The lower limit of operating pressure will in each case, be set by the desired reduction in the percentage concentration of the gas to be removed. Under any given set of operating conditions and a given initial gas mixture, the lower the value to which the concentration of $CO_2$ and/or $H_2S$ must be reduced, the higher the operating pressure in the absorber must be. There is no upper limit of operating pressure except that set by design considerations and other economic factors.

Hot regenerated solution from the regeneration stage is introduced into the top of the column through line 4. The solution enters the top at a temperature not substantially less than the temperature of the solution leaving the regeneration stage. The hot solution flows downwardly countercurrent to the rising gas stream. During this countercurrent contact, carbon dioxide and/or hydrogen sulfide present in the gas stream is absorbed by the solution, and the gas stream, containing a decreased concentration of these components leaves the top of the absorber column by line 5.

If the raw gas introduced into the bottom of the column is not saturated with respect to the scrubbing liquor in the scrubbing tower it will become saturated during its travel through the tower. In such cases it is desirable to provide a condenser 30 in line 5, and to reflux a sufficient amount of the aqueous condensate back to the absorber column to maintain the concentration of the solution in the system at the same level. If the gas mixture entering the bottom of the absorber column is saturated with respect to the scrubbing liquor, a condenser in line 5 would not be necessary.

The mechanism of absorption will, of course, differ depending upon the particular absorbent employed. Employing an aqueous solution of an alkali metal carbonate, for example of potassium carbonate, the following reactions occur during the absorption of carbon dioxide and of hydrogen sulfide, respectively:

$$K_2CO_3 + CO_2 + H_2O \rightleftharpoons 2KHCO_3$$
$$K_2CO_3 + H_2S \rightleftharpoons KHS + KHCO_3$$

In the case of alkali metal carbonate solutions, regeneration is effected by decomposition of the bicarbonate and/or bisulfide formed during the absorption step. Usually decomposition of the bicarbonate or bisulfide is not carried to completion in the regeneration step and consequently, the solution entering the top of the absorption column usually contains a mixture of carbonate, and bicarbonate and/or bisulfide. Accordingly, it is to be understood that the term "aqueous solution of an alkali metal carbonate" includes the use of mixtures of carbonate with bicarbonate and/or bisulfide. It is to be further understood that the term "aqueous solution of an alkali metal phosphate" and "aqueous solution of an alkanolamine" includes mixtures of these compounds with the $CO_2$ and $H_2S$ addition products of these compounds which are formed in the absorber. Using an aqueous solution of monoethanolamine the reactions in the absorber may be represented as follows:

$$2HOC_2H_4NH_2 + CO_2 + H_2O \rightleftharpoons (HOC_2H_4NH_3)_2CO_3$$
$$2HOC_2H_4NH_2 + H_2S \rightleftharpoons (HOC_2H_4NH_3)_2S$$

When employing an aqueous solution of potassium phosphate the reactions occurring in the absorber are as follows:

$$K_3PO_4 + CO_2 + H_2O \rightleftharpoons K_2HPO_4 + KHCO_3$$
$$K_3PO_4 + H_2S \rightleftharpoons K_2HPO_4 + KHS$$

Since all the absorption reactions listed above are exothermic in nature, there will be a progressive rise in the temperature of the scrubbing solution as it passes from the top to the bottom of the absorption column. The magnitude of this rise depends upon the exothermicity of the particular reaction. With potassium carbonate solutions for example, the temperature rise tends to be less than with aqueous solutions of monoethanolamine since the absorption reactions with monoethanolamine are approximately three times as exothermic as those occurring when a potassium carbonate solution is employed.

The fouled solution, containing absorbed acidic gas is removed from the bottom of the column by line 6 and is conducted to a flashing chamber 7 after the pressure on the solution has been substantially reduced by passing through pressure let-down valve 8. By virtue of the reduction in pressure, a portion of the absorbed gas will flash off immediately from the solution. Simultaneously with the evolution of a portion of the absorbed gas, substantial quantities of steam will also be evolved. The mixture of stream and desorbed gas is removed from the flashing vessel through line 9.

The evolution of absorbed gas, and the evolution of steam are both endothermic processes, and accordingly, the temperature of the solution in the flashing vessel will tend to decrease. The magnitude of the temperature drop will depend upon the endothermicity of the decomposition reaction accompanying the gas desorption and upon the amount of steam which is evolved.

The partially regenerated solution is removed from the flashing vessel 7 through line 10 and is conducted to the top of a stripping column 11 equipped with bubble caps 12. A closed steam coil 13 is provided at the bottom of the column. By means of heat supplied through the steam coil 13, solution at the bottom of the column is brought to its boiling point, and the steam produced by the boiling liquid rises countercurrently through the solution flowing downwardly through the column. If desired, direct steam can be used instead of, or in addition to, the closed steam coil 13. The use of a closed steam coil alone, as shown in the drawing, however, is to be preferred in the system shown in Fig. 1.

As a result of the simultaneous boiling and steam stripping to which the solution is subjected in the stripping column, further quantities of the absorbed acidic gas are desorbed, and a mixture of steam and desorbed gas leaves the top of the column by line 14. This mixture is conducted to a condenser, 15, where the steam is condensed and the condensate refluxed back to the top of the tower by line 16. The effluent from the condenser, containing a high concentration of carbon dioxide and/or hydrogen sulfide, is removed by line 17, and may be utilized for any desired purpose.

The mixture of steam and desorbed gas from flashing vessel 7 is introduced, via line 9, into the stripping column at an intermediate level. This manner of operation is advantageous when the concentration of the desorbed gas in the mixture of stream and desorbed gas from the flashing vessel is less than the concentration of the desorbed gas in the mixture leaving the stripping tower by line 14. This will often be the case since, in the flashing operation, steam is usually evolved at a faster rate than is the absorbed gas, probably due to the fact that steam evolution is a purely physical phenomenon, while the evolution of the absorbed gas involves chemical decomposition of the compounds formed in the absorber.

If the concentration of the desorbed gas in the overhead mixture from the flasher is less than the concentration of desorbed gas in the overhead stream leaving the stripping column, this means that the mixture of steam and desorbed gas from the flasher still has stripping capacity with respect to the solution near the top of the stripping column. Advantage may be taken of this stripping ability by introducing the mixture into the column at a level where the partial pressure of $CO_2$ and/or $H_2S$ over the solution at that point is approximately the same as the partial pressure of $CO_2$ and/or $H_2S$ in the overhead mixture from the flasher.

It should be understood, however, that the use of a separate flashing vessel as shown in Fig. 1 is not necessary and may in many cases be dispensed with at little or no loss in over-all operating economy. In such case, the stream from the bottom of the absorber is introduced directly into the top of the regenerator wherein the flashing then takes place as shown in Figs. 2, 7, 8 and 9 of the drawings.

In the embodiment shown in Fig. 1 the regenerator column 11 is maintained at atmospheric pressure or a pressure somewhat above atmospheric, up to 35 lbs./sq. in. gage. At such regenerator pressure (as measured at the bottom of the regenerator column) the solution boiling temperature will range from about 220° F. to 285° F. and the solution accordingly will leave the regenerator at these temperatures and enter the absorber at substantially the same temperatures. As will appear in detail from the subsequent description, regenerator pressures in the close vicinity of atmospheric, or even slightly below atmospheric give the highest thermal efficiencies, although an advantage over existing conventional processes may be obtained even at regenerator pressures as high as 35 lbs./sq. in. gage.

Hot regenerated solution leaves the bottom of the stripping column by line 18 and is recycled to the absorption tower by means of recycle pump 19 and line 4. As previously stated, the process of the invention is characterized by the fact that there is no cooling, or only a small amount of cooling of the stream flowing from the regenerator to the absorber. Thus, in the basic system shown in Fig. 1, the solution is recycled from the bottom of the regenerator to the top of the absorber without cooling of any kind. As will be explained in more detail hereafter, in some cases it may prove desirable to deliberately cool the solution a small amount. Such cooling may be of the entire stream, or the stream feeding from the regenerator to the absorber may be split and fed into the absorber at different levels, the stream entering at the higher level being cooled.

While substantial saving in equipment costs and energy costs may be obtained by using any of the alkaline scrubbing agents previously mentioned in the manner described above, the greatest advantages of the invention are obtained by using concentrated solutions of potassium carbonate. Potassium carbonate-bicarbonate mixtures are only moderately soluble at atmospheric temperatures (in conventional scrubbing processes employing potassium carbonate solutions at atmospheric temperatures ordinarily the potassium normality is no greater than about 3 N). However, at temperatures in the neighborhood of the atmospheric boiling point of the solution, potassium carbonate and mixtures thereof with potassium bicarbonate are much more soluble. This is a distinct advantage since more concentrated solutions can absorb greater amounts of carbon dioxide and hydrogen sulfide per volume of solution. The more concentrated the solution, the smaller the amount of heat energy which is required to remove a given quantity of these gases. In the process of the invention, solutions having potassium normalities of from 4 to 14 and preferably normalities of from 5 to 11, will usually be employed, although in some cases it may be desirable to use dilute solutions.

In contrast to the currently popular ethanolamine solutions, potassium carbonate is a substantially cheaper starting material. Instead of potassium carbonate, potassium hydroxide can be used for making up the initial solution, or for replenishing the solution to compensate for losses during operation. In further contrast to amine scrubbing agents, potassium carbonate solutions suffer no losses due to volatilization, which is a costly problem in the present commercial ethanolamine scrubbing process. Furthermore, potassium carbonate solutions are more ideally suited for use in accordance with the invention in that the exothermicity of the absorption reactions is relatively small, and consequently, the solution undergoes a smaller rise in temperature from the top to the bottom of the absorption column. The amine absorption reactions on the other hand are about three times as exothermic and accordingly the solution rises to a correspondingly higher temperature. Thus for a given temperature at the top of the absorption column, the average absorption temperature in the case of potassium carbonate solutions will be smaller, and at the lower temperature, more efficient scrubbing can be effected.

The relative superiority of potassium carbonate solutions for use in accordance with the invention is still further enhanced by the fact that these solutions have a greater over-all efficiency as scrubbing agents at the relatively high temperatures which are maintained in the absorption stage. To illustrate this fact, reference is made to Table 1 which shows the equilibrium partial pressure of carbon dioxide over aqueous solutions of potassium carbonate and monoethanolamine with varying amounts of carbon dioxide absorbed in the solution.

TABLE 1.—EQUILIBRIUM PRESSURES OF CARBON DIOXIDE OVER ALKALINE SOLUTIONS AT 120° C. (248° F.)

| $CO_2$ content of solution, s.c.f./gal. | I<br>8.1 N $K_2CO_3$ | II<br>2.5 N Monoethanolamine [1] |
|---|---|---|
| | p.s.i.a. | p.s.i.a. |
| 2 | 0.7 | 5 |
| 3 | 1.4 | 17 |
| 4 | 2.8 | 50 |
| 5 | 5.0 | 160 |
| 6 | 9.5 | 500 |
| 7 | 17 | |
| 8 | 28 | |
| 9 | 44 | |

[1] Reed, R. M., and Wood, W. R., Trans. Am. Inst. Ch. Eng., pp. 363–384.

Column I shows the equilibrium partial pressures for a potassium carbonate solution having a potassium normality of 8.1 and at a temperature of 120° C. (248° F.). Column II shows the equilibrium pressures for a 2.5 N aqueous solution of monoethanolamine at a temperature of 120° C. (248° F.).

As can be seen in Table 1, the equilibrium pressures for potassium carbonate (column I) are considerably lower than those of the monoethanolamine. It is apparent that for solutions containing the same amount of absorbed $CO_2$ per gallon, the potassium carbonate solution is capable of absorbing additional amounts of $CO_2$ at smaller $CO_2$ partial pressures. For example, an 8.1 N potassium carbonate solution at 120° C., containing 5 cubic feet of absorbed carbon dioxide per gallon of solution can absorb additional carbon dioxide when the carbon dioxide partial pressure above the solution is somewhat greater than 5 pounds p.s.i.a. On the other hand, a 2.5 N monoethanolamine solution at 120° C. also containing 5 cubic feet of carbon dioxide per gallon cannot absorb additional carbon dioxide unless the carbon dioxide partial pressure over the solution is greater than 160 p.s.i.a.

It will be also noted that the increase in equilibrium pressures of carbon dioxide from the potassium carbonate is much lower than that of the monoethanolamine solution. This means that for a given decrease in the carbon dioxide partial pressure in the gas stream as it enters and leaves the absorber, the carbonate solution will absorb a greater quantity of carbon dioxide per gallon of solution in a single pass through the absorber. For example, if the gas entering the bottom of the absorber contains a partial pressure of carbon dioxide of 50 p.s.i.a. and the gas leaving the top of the absorber contains a carbon dioxide partial pressure of 5 p.s.i.a, and 8.1 N potassium carbonate solution at an average temperature of 120° C. could absorb slightly over 4.0 cubic feet of carbon dioxide per gallon circulated under ideal conditions, while a 2.5 N ethanolamine solution at the same temperature would absorb only 1.8 cubic feet per gallon. The relatively high absorption capacity of potassium carbonate solutions at elevated temperatures makes this type of scrubbing agent particularly suitable for use in accordance with the invention. High absorption capacity, of course, means lower circulation rates and greater heat economy.

Reference is now made to Fig. 2 of the drawings which shows substantially the same basic system as shown in Fig. 1 with the difference that provision is made for maintaining the stripping column under a subatmospheric pressure. Highest thermal efficiencies may often be obtained when stripping pressures are maintained somewhat below atmospheric as will be explained more in detail hereafter.

In Fig. 2 a gas stream from which $CO_2$ and/or $H_2S$ is to be removed is introduced by line 101 into the bottom of the absorber column 102, equipped with bubble caps 103 and otherwise similar in construction to absorber column 2 in Fig. 1. Hot regenerated solution from the stripping column 111 is introduced into the top of the column by line 104 at substantially the same temperature as that of the solution leaving the bottom of stripping column 111. The hot solution flows downwardly countercurrent to the rising gas stream. During this countercurrent contact, carbon dioxide and/or hydrogen sulfide present in the gas stream is absorbed by the solution, and the gas stream, containing a decreased concentration of these components, leaves the top of the absorber by line 105.

A condenser 130 may be provided in line 105 in the event the incoming gases are not saturated with respect to the scrubbing solution, in which case it is desirable to cool the outgoing gases sufficiently to condense out enough water, which is refluxed back to the absorber column by line 130a, to maintain the concentration of the solution at a constant level.

The absorption of the carbon dioxide and/or hydrogen sulfide in the solution, for example of potassium carbonate, results in the release of heat and thus there will be a progressive rise in the temperature of the scrubbing solution as it passes from the top to the bottom of the absorption column, the precise rise depending upon the exothermicity of the absorption reaction, as explained previously. Solution leaving the bottom of the column by line 106, containing absorbed carbon dioxide and/or hydrogen sulfide is conducted to the top of regenerator column 111 after passing through pressure let-down valve 108 where the pressure is reduced to that prevailing in column 111. As the solution passes into the top of the column 111, a portion of the absorbed gas flashes off immediately as a result of the pressure reduction, accompanied by the evolution of steam and a decrease in the temperature of the solution since the evolution of the absorbed gas and of the steam are both endothermic processes. This mixture of steam and desorbed gases leaves the column by line 114.

The solution then passes downwardly through column 111 equipped with bubble caps 112 countercurrent to upwardly rising steam generated near the bottom of the column by means of a closed steam coil 113 which heats the solution to its boiling point at the prevailing column pressure. An open steam coil can be used instead of, or in addition to, the closed steam coil 113 for the purpose of introducing live steam into the solution. As a result of the simultaneous boiling and steam stripping to which the solution is subjected in column 113, further quantities of absorbed gas are stripped from the solution and leave the column, together with further quantities of steam by line 114. The mixture of steam and desorbed gases then pass to condenser 115 where it is cooled sufficiently to condense out enough water to maintain the concentration of the solution at a constant level. The aqueous condensate from condenser 115 is collected in separator 115a and returned to the column through line 116.

The gaseous effluent from separator 115a, which contains a high concentration of $CO_2$ and/or $H_2S$, leaves by line 117 and is exhausted from the system by vacuum pump 118 through line 119. Vacuum pump 118, drawing on separator 115a serves to place column 111 under a subatmospheric pressure. Pump 118 is driven by steam turbine 120 which is supplied with steam under suitable pressure, e.g., 100 to 500 lbs./in.$^2$ gage through line 121. Exhaust steam from turbine 120 at a pressure of, for example, atmospheric to 60 lbs./in.$^2$ gage is preferably conducted by line 122 to steam coil 113 at the bottom of column 111 to supply heat required for boiling and steam stripping therein. Utilization of turbine exhaust steam in this manner will usually be found advantageous since in this way the steam fed to the turbine is eventually condensed in the reboiler coil at the bottom of the regenerator and thus fully utilized.

Hot regenerated solution leaves the bottom of column 111 by line 123 and is recycled to absorption column 102 by recycle pump 124 and line 104 without substantial cooling thereof so that it enters the top of absorber 102 at substantially the same temperature it left the bottom of regenerator column 111. As stated above with reference to Fig. 1, and as will be explained more in detail hereafter, some slight cooling of the solution between regeneration and absorption stages may in some case be desirable.

Reference is now made to Figures 3 and 4 which show the effect of regeneration pressure (i.e., the pressure in lbs./in.$^2$ absolute measured at the bottom of the stripping column) on the steam requirements of the process (as expressed in pounds of steam required per 100 standard cubic feet of dry $CO_2$ removed) when using aqueous potassium carbonate solutions of 30% (5.6 N) and 40% (8.2 N) concentration respectively. Attention is also directed to Fig. 5 which shows the boiling temperatures corresponding to various pressures for 30% and 40% aqueous potassium carbonate solutions.

The data plotted in Figs. 3 and 4 were obtained using a system similar to those shown in Figs. 1 and 2. Obviously, when operating the regenerator column at atmospheric or superatmospheric pressures, the vacuum pump 118 was not used. Absorber pressures of 300 lbs./in.$^2$ gage were used and no cooling of the solution occurred between regeneration and absorption stages. The raw feed gas entering the absorber contained approximately 16% carbon dioxide and the purified gas leaving the top of the absorber contained a residual carbon dioxide content of approximately 0.6%.

In Fig. 3, where a 30% aqueous potassium carbonate solution is employed, curve A shows the amount of energy (expressed as pounds of steam per 100 s.c.f. dry $CO_2$ removed) required to operate steam turbine 120 (Fig. 2) for driving vacuum pump 118 with the gas stream entering the vacuum pump saturated at 100° F.; with a two pound pressure differential between the steam coil 113 and the vacuum pump; and with an over-all combined turbine and pump efficiency of 50%. Thus a value of 5100 B.t.u. per horsepower-hour was used to determine the equivalent steam consumption for maintaining the vacuum.

Curve B shows the amount of steam required in the regenerator column for boiling and steam stripping the solution, while Curve C (broken line) shows the total steam requirements (vacuum pump plus regeneration steam) based on an operation where the exhaust steam from the turbine is fed into the steam coil 113 as shown in Fig. 2 and thus fully utilized.

As may be seen, the steam requirements for creating the vacuum are relatively small down to pressures of about 4 lbs./in.$^2$ absolute at which point they rise very sharply. From Curve B it may be seen that in the given case the steam requirements for regeneration are at a minimum at a pressure of about 10 lbs./in.$^2$ absolute corresponding to a solution boiling temperature of about 200° F. At regenerator pressures below about 10 lbs./in.$^2$ absolute the steam necessary for boiling and steam stripping the solution rises sharply, this being apparently due to the fact that as the boiling temperature of the solution decreases with decreasing pressure, the decomposition of the bicarbonate to carbonate with accompanying release of carbon dioxide becomes more and more difficult. At pressures somewhat below 4 lbs./in.$^2$ absolute the decomposition of the bicarbonate virtually ceases.

In Fig. 4, where a 40% $K_2CO_3$ solution was employed, Curve D represents the steam requirement for the turbine driving the vacuum pump and is identical to Curve A in Fig. 3. Curve E represents the steam requirements for boiling and steam stripping the solution, while Curve F (broken line) shows the total steam requirements. The dotted vertical line G at 7 lbs./in.$^2$ absolute (solution boiling point 185° F.) indicates the demarkation point between operable and non-operable regenerator pressures in the case of the 40% solution resulting from the fact that at lower pressures precipitation of the bicarbonate present in the system occurs because of the correspondingly reduced operating temperatures making operation extremely difficult or impossible. As shown by Curve F, the minimum total steam requirement occurs at about 10 lbs./in.$^2$ absolute (solution boiling temperature of 200° F.).

As indicated by Curves B and E, increasing regeneration pressure in the super-atmospheric range results in increasing energy requirements. However, operation of the stripper at atmospheric pressure or at pressures slightly greater than atmospheric gives thermal efficiencies close to the maximum obtainable and in addition, eliminates the additional capital cost and maintenance expense of a vacuum pump and driver. Curves B and E show the variation in steam requirements at regeneration pressures above atmospheric when the concentration of carbon dioxide in the purified gas is reduced to a relatively low value of approximately 0.6%. When somewhat higher residual carbon dioxide concentrations in the purified gas are permissible, such as 2%, the steam requirements do not increase quite as sharply, and even at regeneration pressures of 50 lbs./in.$^2$ absolute corresponding to a solution boiling temperature of 285° F., considerable savings are possible over conventional processes, such as the commercial ethanolamine process employed widely today in which steam requirements usually run of the order of 25–30 lbs. of steam per 100 s.c.f. of dry $CO_2$ removed.

Speaking generally, taking thermal efficiency under various operation conditions and other factors into consideration, the optimum range of regeneration pressures are pressures corresponding to solution boiling temperatures ranging from 195° F. to 250° F., while considerable savings in heat and equipment costs may be obtained within a broader range of regenerator pressures corresponding to solution boiling temperatures ranging from 175° F. to 285° F. When speaking of "regeneration pressures," reference is always made to the pressure at or near the bottom of the stripping column where all or the main portion of the solution is withdrawn for recycle to the absorber. The pressure at the top of the stripping column will always be somewhat lower, (e.g., .1 to 5 lbs./in.$^2$) because of the pressure drop through the bubble-caps, column packing, or the like used to facilitate gas-liquid contact in the column.

As previously stated, cooling of the solution to any substantial extent between regeneration and absorption should be avoided; that is, the solution leaving the stripping column for recycle to the absorption column should be subjected to no cooling or only a small amount of cooling. Figure 6 shows the effect of cooling the solution on steam consumption (expressed as pounds of steam required per 100 standard cubic feet of $CO_2$ removed) for two typical conditions using a system similar to that shown in Fig. 1. In both cases a 40-percent aqueous potassium carbonate solution was employed; and the regeneration pressure was 3 lbs./in.² gage, corresponding to a solution coiling temperature of 230° F. The raw feed gas contained 30 percent $CO_2$ and the absorber pressure was 300 lbs./in.² gage. In each case the entire stream leaving the stripper for recycle to the absorber was cooled in an indirect water cooler to varying extents and the variation in steam consumption noted. The horizontal axis shows the number of degrees Fahrenheit the solution was cooled below the solution temperature leaving the bottom of the stripper (230° F.), while the vertical axis shows the steam consumption in the stripper in pounds of steam per 100 s.c.f. of dry $CO_2$ removed from the raw gas. Curve X is the curve developed when removing the $CO_2$ down to a residual value of 0.8 percent, while Curve Y is that developed when scrubbing out the $CO_2$ down to a residual value of 2 percent.

Note that in both cases the steam consumption increases slowly at first and then more and more rapidly as the solution is cooled by increasing amounts. In both cases, the curves are relatively flat (that is the steam consumption increases relatively slowly with increasing cooling) up to about 30° F. Curve X becomes quite steep about 40° F., while Curve Y rises sharply at about 55° F.

When operating in the manner illustrated in Fig. 1 and using indirect water cooling of the solution as it travels from the stripper to the absorber, it is obviously disadvantageous to subject the solution to any cooling at all since even slight cooling results in increased steam consumption, although, as shown by Curves X and Y, the steam consumption does not rise greatly when the solution is cooled by as much as 30° F. In some modifications of the invention, however, the thermal efficiency may actually be increased by subjecting the solution to some cooling. Several such modifications will be discussed subsequently, one of which involves splitting the stream of regenerated solution into two portions, one of which is cooled and introduced into the top of the absorber column, and the other of which is not subjected to cooling and introduced into the absorber at an intermediate level. Another modification where the solution may be cooled to some extent with an increase in efficiency involves flashing off steam from the hot solution leaving the bottom of the stripper for recycle to the absorber by reduction in pressure, and then using the flash steam to assist in stripping the solution. Even in these modifications, however, cooling of the entire stream of scrubbing solution more than 55° F. will result in a sharp increase in steam consumption which will more than offset any disadvantage gained, and in fact there will usually be little advantage to be gained even in such modifications in cooling the solution more than an amount equivalent to cooling the entire solution stream 40° F.

Another consideration which limits the amount of cooling to which the solution should be subjected is the danger of precipitating salts from the solution by excessive lowering of the solution temperature. To avoid the danger of this occurring, which would render the process inoperable, the solution temperature should not be reduced below 175° F., that is, the temperature of the main portion of the stream entering the absorber should not be reduced below a minimum of 175° F.

While the basic system illustrated in Figs. 1 and 2 provide excellent thermal efficiencies and a minimum of equipment cost, still further heat economy may be obtained by the use of various modifications of the process with only relatively small increase in equipment costs. One such variation, mentioned briefly above, is to split the stream of regenerated solution leaving the bottom of the regenerator into two separate streams, a minor stream, equivalent for example to one-third of the total flow, and a major stream equivalent; e.g., to two-thirds of the total flow. The minor stream is then subjected to cooling to bring its temperature down as much as 100° F., for example, below the temperature of the main stream (but avoiding temperatures below which dissolved salts precipitate from the solution), and this cooled minor stream is then introduced into the top portion of the absorber. The main stream, on the other hand, is recirculated to the absorber with little or no cooling and is introduced therein separately at an intermediate level below the point of introduction of the minor, cooled stream. By thus cooling the minor stream entering the top of the absorber, the partial pressure of $CO_2$ and/or $H_2S$ over the solution at the top of the absorber is reduced, thus permitting the residual concentration of $CO_2$ and/or $H_2S$ in the gas stream leaving the absorber to be reduced to lower levels. Since only a minor portion of the total flow is cooled, the over-all sensible heat loss from such cooling is relatively small. For example, if one-third of the total flow were cooled 60° F., this would amount only to cooling the total flow 20° F. This variation is equally applicable whether the regeneration takes place at sub-atmospheric, atmospheric, or super-atmospheric pressures, and accordingly it may be used equally well in any of the systems described herein.

A further variation that may be advantageously employed, particularly when it is desired to obtain lower residual $CO_2$ concentrations, is to more thoroughly regenerate a minor portion of the total stream, by additional boiling and steam stripping, and to introduce this minor, more thoroughly regenerated portion into the top of the absorber column while the major, less thoroughly regenerated portion is introduced into the absorber at an intermediate level. This has the same net effect as cooling the solution as described in the paragraph above, namely to reduce the partial pressure of $CO_2$ and/or $H_2S$ over the solution at the top of the absorber and thus permit the residual concentration of $CO_2$ and/or $H_2S$ in the gas stream leaving the absorber to be reduced to lower levels. As in the case of cooling a minor portion of the stream, this variation is equally applicable whether regeneration of the solution takes place at sub-atmospheric, atmospheric, or super-atmospheric pressures.

Reference is now made to Fig. 7 of the drawings which illustrates a system embodying both of the above variations. As shown in Fig. 7, no provision is made for placing the regenerator column under sub-atmospheric pressures, but it should be understood that if desired such means may be provided in this system, such as a vacuum pump and turbine as shown in Fig. 2.

Referring to Fig. 7, a gas mixture containing either or both carbon dioxide and hydrogen sulfide is introduced by line 40 into an absorption tower 39 maintained under super-atmospheric pressure. The gas mixture rises through the tower in countercurrent contact with hot scrubbing solution introduced into the tower by lines 53 and 56. Scrubbed gas is removed from the top of the tower by line 41 and, if necessary, is passed through a condenser 42. Condenser condensate refluxes back into the column by line 43. Fouled solution is withdrawn from the bottom of the tower by line 44 and, after passing through pressure letdown valve 46 where it is subjected to a substantial reduction in pressure, is introduced into the top of the stripping tower.

A closed stream coil 50 is provided at the bottom of the tower. Heat introduced through the steam coil brings the solution at the bottom of the tower to its boiling point, and steam generated by the boiling solution rises through the stripping column countercurrently to the descending solution.

A mixture of desorbed gas and steam leaves the top of the tower by line 57 and is passed through a condenser 58. The gaseous effluent from the condenser leaves the system by line 59. Condenser condensate refluxes back to the stripping tower by line 60.

The major portion of the scrubbing solution descending through the stripping tower is withdrawn therefrom by line 51 at a point somewhat above the bottom of the tower, as can be seen in the drawing. This portion of the solution is returned, without cooling, by way of recycle pump 52 and line 56 to the absorption tower, and is introduced into the absorption tower at a point somewhat below the top of the tower, as illustrated in the drawing.

A relatively small portion of the scrubbing solution is permitted to descend to the bottom of the stripping tower, and is thereby subjected to additional stripping, resulting in the removal of further quantities of absorbed gas. This more completely regenerated portion of the solution is removed from the bottom of the stripping tower by line 54, and is returned by recycle pump 55 and line 53 to the top of the absorption tower 39. This relatively small portion of the solution may be cooled, 60° F., for example, below the temperature of the stream in line 56 (taking care not to precipitate out the dissolved salts) before introduction into the absorption tower, cooler 400 being provided in line 53 for this purpose.

With the arrangement illustrated in Figure 7 the gas at the top of the absorption tower is brought into contact with a scrubbing solution at a lower temperature and containing a concentration of absorbed gas significantly lower than the concentration of absorbed gas in the major portion of the solution entering the tower by line 53. This results in a significant reduction in the final concentration of carbon dioxide and hydrogen sulfide in the gas leaving the absorption tower since the ultimate reduction in the concentration of these gases is fixed by the partial pressure of these gases over the solution at the top of the tower. By subjecting only a minor portion of the total solution to cooling and to a higher degree of regeneration, as in the process illustrated in Figure 7, lower residual concentrations of $CO_2$ and/or $H_2S$ in the scrubbed gas can be achieved (such as down to 0.2 to 0.4% $CO_2$) at lower energy consumption than can usually be obtained under equivalent conditions in the systems shown in Figures 1 and 2. The system illustrated in Figure 7 is particularly advantageous in that no major items of additional equipment are required.

It will be understood, of course, that either of the two variations embodied in Fig. 7 may be used separately. Thus, cooling of the minor stream may be employed without more thoroughly regenerating it. In this case, the entire stream would be withdrawn from the bottom of the regenerator by line 54 and a relatively minor portion passed through cooler 400 and introduced into the top of column 39 by line 53 while the major portion of the stream bypasses the cooler and enters column 39 at a lower level. Likewise, more thorough regeneration of the relatively minor stream may be employed without cooling in which case the cooler 400 is omitted.

As pointed out previously, cooling of the entire stream more than 55° F. results in a sharp decrease in thermal efficiency and should in all cases be avoided. As applied to the "split-stream" operation described above, this means that the minor stream should not be cooled more than an amount equivalent to cooling the entire stream 55° F. and preferably by no more than an amount equivalent to cooling the entire stream 40° F. Often the danger of precipitation of salts from the solution will be the controlling factor and normally the minor stream in such an operation will not be cooled more than 50° F. below the temperature of the main stream.

Another variation of the basic system, also mentioned briefly above, involves reduction of the pressure on the regenerated stream of solution leaving the stripping tower, which results in the evolution of substantially pure steam, this steam then being used in the stripping operation as stripping steam. Besides furnishing steam for the stripping operation, this results in cooling of the solution, which in turn results in a lower average partial pressure of carbon dioxide and/or hydrogen sulfide in the absorber rendering the solution more effective in the absorption stage.

Reference is now made to Figure 8 which shows the above variation in a "split-stream" type of operation. Raw gas, containing for example 25 percent $CO_2$ enters the absorption column 301 maintained at an elevated pressure of e.g. 350 lbs./in.$^2$ gage by line 302. Column 301 may be supplied with any suitable column packing 303. The raw gas flows upwardly, countercurrent to the solution entering the column by lines 304 and 305. Purified gas containing e.g. 0.5 percent $CO_2$ leaves the column by condenser 321 and line 306.

Fouled solution, containing absorbed $CO_2$ leaves the bottom of column 301 by line 307, passes through pressure reduction valve 308 and enters the top of the stripping column 309 maintained at substantially atmospheric pressure, for example, where a portion of the $CO_2$ and quantities of steam flash off due to the reduction in pressure. Column 309 is provided with a closed steam coil 310 and additional steam is injected directly into the solution by line 312 as will be described in more detail below.

The solution descends in column 309 countercurrently to ascending steam introduced and generated at the bottom of the column and absorbed $CO_2$ is thus stripped from the solution and a mixture of steam and $CO_2$ leaves the top of the column by condenser 322 and line 313.

Lean, regenerated solution is withdrawn from the bottom of column 309 at a temperature of e.g. 230° F. The major portion of this solution e.g., two-thirds of the total flow is recycled to an intermediate level of the absorption column 301 by recycle pump 314 and line 304 without cooling. A minor portion of the total flow, e.g., one-third, is conducted by line 315 through pressure reduction valve 316 to a flashing chamber 317 which is evacuated to a reduced pressure of, e.g., 7–12 pounds/in.$^2$ absolute, by means of a thermo-compressor 318 drawing on chamber 317 through line 319. Thermocompressor 318 is a steam jet ejector used to boost low pressure steam to higher pressures by use of high-pressure motive steam. Thermocompressor 318 is supplied with motive steam by line 320 at a pressure of, e.g. 100 lb./in.$^2$ gage. In place of thermocompressor 318 a mechanically driven compressor may be employed to evacuate chamber 317 and compress the evolved steam to the pressure prevailing at the bottom of column 310, e.g. 3 lb./in.$^2$ gage.

The steam evolved in chamber 317, compressed as described above, together with the motive steam introduced by line 320, is fed into the bottom of column 309 by line 312 and serves to provide a portion of that required to boil and strip the solution descending through the column. Additional steam required to complete the stripping operation is generated by closed steam coil 310.

As a result of the evolution of steam in chamber 317, the solution is cooled from, e.g., 230° F. to 195° F. and at this temperature is recycled to the top of absorption column 301 by recycle pump 323 and line 305. The carbon dioxide partial pressure over the cooled solution entering the top of the absorber is reduced, permitting further reduction in the residual concentration of carbon dioxide in the gas being scrubbed.

By thus cooling the solution by reduction of pressure and utilizing the evolved steam for stripping, additional steam economies can be effected in contrast to cooling the split stream by indirect cooling. In the latter case, the heat abstracted in the indirect cooler is wasted, while in the embodiment of Fig. 8 useful steam is recovered in the cooling process.

Instead of using pressure reduction to evolve steam in connection with a "split-stream" type of operation, it may be used in connection with the system shown in Figs. 1 and 2 by cooling the entire stream leaving the bottom of the stripping column for recycle to the absorber by this method and feeding the steam evolved in the process into the stripper.

The extent to which either the split stream and/or the entire stream is cooled by flashing and recovering the steam should be determined by an economic study in which the value of the steam so recovered is balanced against the additional equipment involved and the power or steam required for recompression of flash steam. In any event cooling of the split or entire stream should not be more than an amount equivalent to cooling the entire stream 55° F. and preferably not more than 40° F.

Attention is now directed to Fig. 9 in which a more elaborate variation of the basic system is shown incorporating the features of "split-stream" operation with both cooling and more thorough regeneration of the minor stream and also incorporating cooling of a portion of the solution by pressure reduction. In this variation a minor portion of the solution leaving the main regenerator is subjected to further regeneration at a higher pressure and temperature. It is then flashed down by pressure reduction approximately to the temperature of the main stream leaving the main regenerator and returned to the top of the absorber. While the use of two regenerators operating at different pressures adds somewhat to the equipment costs, this system is ideally suited for reducing the concentration of $CO_2$ and/or $H_2S$ in the purified gas down to low levels at good operating economy. As will appear from the subsequent description, it is possible to very thoroughly regenerate the minor stream of the solution at little additional energy expenditures since the steam used to boil and steam strip the minor portion at a relatively high pressure can be utilized in the main boiling and steam stripping operation which takes place at a lower pressure. While in Figure 9 the system is illustrated with the main regenerator equipped with a vacuum pump to maintain it at sub-atmospheric pressure, it should be understood that the main regenerator, if desired, may be operated at atmospheric or slightly greater than atmospheric pressure.

Referring now to Figure 9, the gas to be scrubbed of $CO_2$ and/or $H_2S$ is introduced into the bottom of absorber 202 maintained under a superatmospheric pressure of for example 300 lbs./in.$^2$ through line 201 and rises countercurrently to descending scrubbing solution introduced by lines 203 and 204. Purified gas leaves the top of the absorber by line 205, condenser 206 being provided if necessary to maintain the concentration of the solution at a constant level by refluxing aqueous condensate back into the absorber through line 206a.

Scrubbing solution containing absorbed $CO_2$ and/or $H_2S$ leaves by line 207 and passes through pressure letdown valve 208 and thence to regenerator column 209 maintained at a sub-atmospheric pressure corresponding for example to a solution boiling temperature at the bottom of the column of 200° F. A mixture of steam and desorbed gas which flashes off at the top of the column by virtue of the pressure reduction leaves column 209 by line 210 together with steam and desorbed gas rising through the stripping column.

The top effluent from the column 209 is passed through condenser 211 where it is cooled to condense out sufficient water to maintain the concentration of the solution constant, this aqueous condensate being collected in separator 212 and returned by line 213 and pump 214 to the top of column 209. $CO_2$ and/or $H_2S$ in concentrated form is exhausted from the system through vacuum pump 215 and line 216. Pump 215 is driven by turbine 217 supplied with motive steam through line 218.

Regenerated solution at a temperature of for example 200° F. leaves column 209 by line 219. The major portion of this stream, e.g. two-thirds, is recycled directly by recycle pump 220 and line 204 to column 202 into which it is introduced at an intermediate level.

A minor portion of the total stream, e.g. one-third, is introduced by line 221 and pump 222 into the top of secondary regenerator column 223 maintained at a higher pressure than the main regenerator column 209 such as a pressure of approximately 30 lb./in.$^2$ gage corresponding to a solution boiling temperature of 290° F. Stripping steam for column 223 is provided by means of a closed steam coil 224 at the bottom of the column which is supplied with exhaust steam from turbine 217 through line 225. Instead of using closed steam coil 224, steam may be injected directly into the bottom of column 223. All of the steam needed in the main regenerator 209 may be, and preferably is, generated or introduced directly at the bottom of column 223. To compensate for a tendency of the solution to become more concentrated in column 223, when using a closed steam coil as in Figure 9, condensate from separator 212 may be introduced into column 223 by line 235.

The main portion of the steam thus generated or introduced into column 223 rises upwardly through the column and is conducted by line 226 and pressure let-down valve 227 directly into the bottom of column 209. The concentration of $CO_2$ and/or $H_2S$ in the overhead stream from column 223 will of course be low since the bulk of these gases have already been removed in the first regeneration stage.

Most of the steam utilized to raise the temperature of the solution from, for example, 200° F. leaving column 209 to 290° F. leaving column 223 may be recovered and utilized in column 209 by flashing the solution leaving column 223 by line 228 down to a pressure slightly above that prevailing in column 209. For this purpose, the solution passes through pressure let-down valve 229 into flashing vessel 230. Steam evolved as a result of the pressure reduction passes out by overhead line 231 and is injected directly into the bottom of column 209. Steam in lines 226 and 231 is shown as being introduced directly into the bottom of column 209, this being preferred to avoid the use of another reboiler coil which is often an expensive item of equipment. It is to be understood, however, that any desired combination of direct or indirect steam may be used in both columns 209 and 223, the choice of a particular combination being dictated by convenience and economy.

Flashing of the solution down to approximately the pressure at the bottom of the main regenerator column 209 results in cooling the solution back down to the temperature of the solution leaving column 209 by line 219. The more thoroughly regenerated solution may then be recirculated by line 232, recycle pump 233 and line 203 to the top of absorber 202. If desired, this minor stream may be cooled by means of cooler 234 by for example 30°–60° F. (taking care to avoid precipitation of dissolved salts).

Operation in the above manner is particularly advantageous when it is desired to reduce the residual concentration of $CO_2$ down to low levels such as 0.1%–0.2%. The minor stream of solution is subjected to extremely thorough regeneration in regenerator 223 since all the steam needed for the main regenerator is first utilized for boiling and steam stripping this minor portion. The highly regenerated solution entering the top of the column 202 through line 203 is thus capable of reducing residual $CO_2$ concentration to low values particularly if it is also cooled somewhat.

Since the absorption is conducted under pressure, the invention will find its more valuable applications in cases where the raw gas is available under pressure, or where the purified gas must be under pressure to be suitable for its intended use. The removal of carbon dioxide or hydrogen sulfide from natural gas is an example of an advantageous application of the invention. Natural gas is ordinarily available from the well at pressures in excess of 100 pounds per square inch. Often this gas contains considerable quantities of carbon dioxide and/or hydrogen sulfide and the removal of these diluents can be accomplished at low cost using the process of the invention. The purification of synthesis gas (hydrogen-carbon monoxide mixtures) produced by coal gasification or by natural gas reforming, or the purification of hydrogen produced by the water gas shift reaction, are examples of particularly advantageous applications of the invention, especially when the purified gas is to be employed under elevated pressures, or is produced under elevated pressures. The raw gas from the gasifier or reformer, or from the shift reactor, containing considerable amounts of carbon dioxide, and often containing in addition considerable quantities of hydrogen sulfide, is at a high temperature and is usually completely saturated with steam. Most desirably, the raw gas is scrubbed as it comes from the shift reactor, gasifier or reformer without cooling to low temperatures. Thus for example, the method of the invention could be advantageously employed for the purification of synthesis gas, for the Fischer-Tropsch synthesis, the methanol synthesis, and the so-called "Oxo" synthesis which usually operate at pressures above 200 pounds per square inch. The invention would also find valuable application in the purification of hydrogen for the ammonia synthesis. Another particularly advantageous application of the invention is in the removal of carbon dioxide from the recycle gas in the Fischer-Tropsch process. This gas is at an elevated pressure, ordinarily of the order of 400 pounds per square inch, and is saturated with water vapor, and consequently can be processed according to the present invention at a minimum cost. In such an application, the use of an absorption step conducted at elevated temperature is a distinct advantage since otherwise, the synthesis gas would have to be cooled practically to atmospheric temperature prior to scrubbing and then reheated to synthesis temperature.

While the process may be employed to remove $CO_2$ and/or $H_2S$ from gas mixtures containing these gases in any appreciable concentrations, it is particularly advantageous when employed for treating gas mixtures containing relatively high concentrations of $CO_2$ (such as a gas containing 10% to 35% $CO_2$) to produce a purified gas having its $CO_2$ content reduced to values such as 0.2% to 2%, or for simultaneously removing relatively large amounts of $CO_2$ together with relatively small amounts of $H_2S$ from a gas mixture such as might result for example from the gasification of coal or sulfur containing oil. For example, a gas stream containing 16% $CO_2$ and 0.6 $H_2S$ may be treated in accordance with the invention to reduce the $CO_2$ concentration down to 0.2% and at the same time reduce the concentration of $H_2S$ to less than five grains per 100 cu. ft. While the invention is primarily concerned with the removal of $CO_2$ and/or $H_2S$ it is to be understood that other undesired components in a gas mixture may also be absorbed by the scrubbing solution and also removed. For example, carbon oxysulfide (COS) may be absorbed to some extent in a solution of potassium carbonate and thus removed along with $CO_2$ and/or $H_2S$.

To avoid corrosion in the system any suitable inhibitor can be used. The use of sodium dichromate in concentrations of 0.2% to 0.3% by weight of the potassium carbonate solution has been found to satisfactorily inhibit corrosion when scrubbing out $CO_2$ and/or $H_2S$ with $K_2CO_3$ solutions. The dichromate is probably reduced by $H_2S$, but if prior to admitting the $H_2S$ containing gases, the carbonate solution is circulated one to two days through the system, a protective film is deposited on iron surfaces which in most cases is not attacked by $H_2S$. Operation at lower regenerator temperatures (such as 200° F. rather than 230° F.) and the use of less concentrated solutions (such as a 30% $K_2CO_3$ solution rather than a 40% solution) both tend to reduce the tendency for corrosion to take place, and to lessen the necessity for inhibitors even when carbon steel is employed for most of the equipment.

In the description above, the use of steam has been specified for supplying the heat necessary for regenerating the solution. It should be understood, however, that the heat for regeneration may be supplied from any desired source or combination of sources, such as by a stream of hot waste gases fed into a closed coil in the regenerator. Thus for example, it may be found desirable to pass the raw feed gas, when this is hot and saturated with water vapor, first through a closed coil at the bottom of the regenerator and then to the absorber, thus supplying part or all of the heat needed for regeneration. When steam is employed, it may be high or relatively low pressure steam depending on the relative availability, cost and convenience of either type. When using sub-atmospheric regenerator pressures corresponding for example to a solution boiling temperature of 200° F., it becomes possible even to utilize atmospheric pressure steam. While a steam driven turbine has been shown in Figures 2 and 9, other means for driving the vacuum pump may be employed such as an electric motor.

The energy savings possible by using the process of the invention as compared to conventional processes, such as an ethanolamine scrubbing process where absorption takes place at e.g. 120° F. and boiling and steam stripping takes place at e.g. 220° F. to 280° F., are very considerable. In many cases, particularly when the removal of large concentrations of $CO_2$ and/or $H_2S$ is involved, from 50% to 75% of the total heat required in conventional processes may be saved by use of the invention. The lower heat requirements of the process of the invention are also reflected in capital savings by reducing the size of the boiler installation necessary to provide the heat required (usually in the form of steam). Also, since little or no cooling water is employed in the process, cooling water costs are eliminated or substantially reduced. Likewise, as previously mentioned, since most or all of the usual heat exchange equipment required for interstage heat exchange between hot and cool solution is eliminated, very substantial savings, of the order of 50% of the total cost of the gas purification plant proper, are obtained.

*Examples 1–7*

In all the following examples, a system was employed substantially the same as that illustrated in Fig. 1. The absorption tower consisted of a column having a height of 8 feet and a diameter of 4 inches and was packed with ½ inch Raschig rings. The stripping tower was a column 6 feet in height and 6 inches in diameter, packed with ¾ inch Raschig rings.

A number of runs in accordance with the invention were made using aqueous potassium carbonate and monoethanolamine solutions. In these runs, there was no cooling between the stripping tower and the absorption tower. For the purpose of comparing the results obtained by operation in accordance with the invention with those obtained by conventional processes where absorption is effected at substantially atmospheric temperature, a number of parallel runs were conducted under conventional conditions using the same pressure in the absorption tower, using substantially the same liquid to gas ratio, (expressed in gallons of solution circulated per thousand standard cubic feet of gas treated) and using a feed gas of the same composition, viz. a gas consisting of approximately 28% carbon dioxide and 72% nitrogen. During each run the steam consumption was noted. The pertinent data for these runs (Runs 1 to 7) are listed in the accompanying Table 2. Examples 3, 4, 6, and 7 were conducted in accordance with the invention, while Runs 1, 2, and 5 were conducted in the conventional fashion.

TABLE 2.—DATA FROM SMALL PILOT PLANT

| Example | 1 | 2 | 3 | 4 | 5 | 6 | 7 |
|---|---|---|---|---|---|---|---|
| Scrubbing solution | Cold 5 N MEA[a] (30% MEA by weight) | Cold 5 N MEA (30% MEA by weight) | Hot 5 N MEA (30% MEA by weight) | Hot 5 N MEA (30% MEA by weight) | Cold 2.5 N $K_2CO_3$ (15% $K_2CO_3$ by weight) | Hot 8.1 N $K_2CO_3$ (40% $K_2CO_3$ by weight) | Hot 8.1 N $K_2CO_3$ (40% $K_2CO_3$ by weight) |
| Temperature feed gas, °F | 70 | 70 | 238 | 260 | 100 | 244 | 260 |
| Temperature top of absorption tower, °F | 95 | 100 | 239 | 259 | 104 | 244 | 262 |
| Temperature bottom of absorption tower, °F | 129 | 139 | 253 | 277 | 109 | 256 | 275 |
| Temperature entering flashing chamber, °F | | | 244 | 266 | | 244 | 274 |
| Temperature top of stripping tower, °F | 201 | 214 | 228 | 246 | 205 | 235 | 250 |
| Temperature bottom of stripping tower, °F | 235 | 253 | 239 | 259 | 241 | 243 | 262 |
| Pressure in absorption tower, p.s.i.g | 300 | 300 | 300 | 300 | 300 | 302 | 302 |
| Pressure in flashing chamber, p.s.i.g | | | 10 | 20 | 12 | 10 | 21 |
| Pressure in stripping tower, p.s.i.g | 10 | 20 | 10 | 20 | 10 | 10 | 20 |
| L/G, gallons of solution circulated per 1,000 s.c.f. of gas treated | 51.8 | 53.0 | 57.8 | 59.7 | 60.0 | 51.3 | 43.9 |
| Composition of feed gas: | | | | | | | |
| Percent $CO_2$ | 27.6 | 28.2 | 27.2 | 28.1 | 28.0 | 27.7 | 28.9 |
| Percent $N_2$ | 72.4 | 71.8 | 72.8 | 71.9 | 72.0 | 72.3 | 71.1 |
| Composition of gas from absorption tower: | | | | | | | |
| Percent $CO_2$ | 12.5 | 12.0 | 20.3 | 21.0 | 19.8 | 16.3 | 16.8 |
| Percent $N_2$ | 87.5 | 88.0 | 79.7 | 79.0 | 80.2 | 83.7 | 83.2 |
| Composition of gas from stripping tower: | | | | | | | |
| Percent $CO_2$ | 98.5 | 98.5 | 98.7 | 96.5 | 96.5 | 95.9 | 98.7 |
| Percent $N_2$ | 1.5 | 1.5 | 1.3 | 3.5 | 3.5 | 4.1 | 1.3 |
| $CO_2$ absorbed, s.c.f./gallon of solution circulated | 3.27 | 3.79 | 1.83 | 1.69 | 1.70 | 2.53 | 2.98 |
| Steam requirements,[b] s.c.f. of $CO_2$ removed per pound of steam consumed | 4.6 | 4.7 | 9.8 | 13.6 | 2.5 | 16.2 | 9.9 |

[a] Monoethanolamine.
[b] Steam requirements in examples employing low temperature scrubbing based on a 40° F. temperature approach in the heat exchanger between the absorption and scrubbing tower.

Comparing Examples 1 and 2 in which scrubbing was effected by a monoethanolamine solution at atmospheric temperature, to Examples 3 and 4, in which scrubbing was effected at an average temperature of 246° F., it is apparent that the steam requirements as expressed in standard cubic feet of carbon dioxide removed per pound of steam consumed at substantially less in Examples 3 and 4. By operation in accordance with the invention, approximately two to three times as much carbon dioxide was removed per pound of steam consumed than in the conventional process under equivalent operating condition, which means, of course, a savings of 50% to 70% in the total amount of heat energy required.

Comparing Example 5 in which scrubbing was effected by a potassium carbonate solution at atmospheric temperature, to Examples 6 and 7 in which scrubbing was effected at an average temperature of 242° F. and 272° F., respectively, it is apparent that the steam requirements are very much less in Examples 6 and 7. Five or six times as much carbon dioxide was removed in these examples per pound of steam consumed, which means a saving of up to 85% of the total amount of heat energy required as compared to a conventional process employing a cold potassium carbonate solution as the scrubbing agent.

Comparing Examples 3 and 4 and Examples 6 and 7, all of which were conducted in accordance with the invention, it is apparent that the greatest steam economy is obtained with the use of a potassium carbonate solution, although the amine process operated in accordance with the invention is far more economical in steam requirements than the conventional amine process. The relative superiority of the potassium carbonate solution for use in accordance with the invention is also indicated by the greater amount of carbon dioxide absorbed per gallon of solution circulated. It will also be noted that, as compared to the amine solution, the use of a potassium carbonate solution in accordance with the invention resulted in a greater reduction in the percentage concentration of carbon dioxide in the purified gas from the absorption tower. The pertinent data from eight test runs, Examples 8–15, in this equipment are set forth in the attached Table 3.

*Examples 8–15*

In a large pilot plant operated to obtain further data on the process, an absorber, was employed having a diameter of 6 inches and height of 25 feet packed with ½ inch Raschig rings in the lower section and a height of 4 feet in the upper section packed with ¼ inch diameter Raschig rings. When operating with a split stream, the minor portion of the stream (usually one-third) was fed to the top of the absorber and the major portion to the top of the lower section. The regenerator column was 8 inches in diameter and 25 feet high and was packed with ½ inch Raschig rings.

TABLE 3.—DATA FROM LARGE PILOT PLANT

| Scrubbing Agent | Example No. | $CO_2$ Content of— | | Carrying Capacity, std. cu. ft. $CO_2$/gal. | Regeneration Efficiency, std. cu. ft. $CO_2$/lb. steam | Steam Consumption, lbs. steam/100 cu. ft. $CO_2$ |
|---|---|---|---|---|---|---|
| | | Feed Gas, Vol. Percent | Scrubbed Gas, Vol. Percent | | | |
| 2.5 N Cold Monoethanolamine | 8 | 20.0 | 2.0 | 4.0 | 3.9 | 25.6 |
| 8.1 N Hot Carbonate: | | | | | | |
|   Single Stream | 9 | 19.9 | 1.8 | 3.7 | 9.4 | 10.6 |
|   Split Stream | 10 | 20.3 | 1.9 | 4.1 | 9.8 | 10.2 |
|   Flash Cooling Entire Stream | 11 | 20.0 | 2.0 | 4.0 | 12.4 | 8.1 |
| 2.5 N Cold Monoethanolamine | 12 | 20.0 | 0.5 | 4.1 | 3.8 | 26.3 |
| 8.1 N Hot Carbonate: | | | | | | |
|   Single Stream | 13 | 16.5 | 0.8 | 3.7 | 6.05 | 16.5 |
|   Split Stream | 14 | 20.8 | 0.7 | 4.3 | 7.5 | 13.3 |
|   Flash Cooling Entire Stream | 15 | 20.0 | 0.5 | 4.1 | 9.3 | 10.8 |

Example 8 is representative of typical results with a cold 2.5 N (15 weight percent) monoethanolamine solution when scrubbing a gas containing 20% $CO_2$ to a value of 2.0% $CO_2$ at 300 p.s.i.g. pressure. A regeneration efficiency of 3.9 cu. ft. $CO_2$/lb. steam, equivalent to a steam consumption of 25.6 lbs. steam/100 cu. ft. $CO_2$ agrees quite closely with that obtained in commercial practice. In contrast, in Example 9, with a 8.1 N (40 weight percent) hot potassium carbonate solution under similar operating conditions employing a single stream feet to the absorber, a regeneration efficiency of 9.4 cu. ft. $CO_2$/lb. steam or 10.6 lbs. steam/100 cu. ft. $CO_2$ was obtained. This is only 40% of the steam required in amine purification in Example 8. A further improvement is shown in Example 10 where split stream operation was used, one-third of the solution being cooled 36° F. and fed to the top of the absorber. Here the regeneration efficiency was increased to 9.8 cu. ft. $CO_2$/lb. steam or 10.2 lbs. steam/100 cu. ft. $CO_2$. Example 11 shows the effect of flash cooling the entire stream 11° F. and reusing the steam as part of that required for regeneration. The regeneration efficiency is increased to 12.4 cu. ft. $CO_2$/lb. steam or 8.1 lbs. steam/100 cu. ft. $CO_2$ based upon the total outside steam required.

Example 12 shows typical results with a cold 2.5 N monoethanolamine solution when scrubbing a raw gas containing 20% $CO_2$ to 0.5% $CO_2$. The regeneration efficiency is 3.8 cu. ft. $CO_2$/lb. steam equivalent to a steam consumption of 26.3 lbs. steam/100 cu. ft. $CO_2$. A hot potassium carbonate solution was employed in Example 13 under similar operating conditions, with a single solution feed stream to the absorber and in this run a regeneration efficiency of 6.05 cu. ft. $CO_2$/lb. steam or 16.5 lbs. steam/100 cu. ft. $CO_2$ was obtained, a considerable advantage over amine scrubbing. A further advantage is shown in Example 14 with split stream operation, cooling the minor portion 36° F. and feeding the split stream to the top of the absorber. In this example a regeneration efficiency of 7.5 cu. ft. $CO_2$/lb. steam or 13.3 lbs. steam/100 cu. ft. $CO_2$ was obtained. In Example 15 an improvement was obtained by flash cooling the split stream 36° F., as shown in Fig. 8, reusing the steam as a portion of that required for regeneration. A regeneration efficiency of 9.3 cu. ft. $CO_2$/lb. steam or 10.8 lbs. steam/100 cu. ft. $CO_2$ resulted for this condition, again showing considerable improvement over conventional scrubbing with amine solution.

It is to be understood that the above description, together with the specific examples and embodiments described, is intended merely to illustrate the invention, and that the invention is not to be limited thereto, nor in any way except by the scope of the appended claims.

We claim:

1. A method for removing slightly acidic gases selected from the group consisting of $CO_2$ and $H_2S$ from a gas mixture containing at least one of these gases, said method involving the use of a scrubbing solution which is continuously recycled between an absorption column and a regeneration column and comprising the steps of contacting the gas mixture in an absorption column maintained at a superatmospheric pressure of at least 50 lbs. per square inch gage with a scrubbing solution comprising an aqueous solution of an alkaline reagent selected from the group consisting of alkali metal carbonates, alkali metal phosphates, and alkanolamines, conducting the solution from said absorption column containing absorbed gases to a regeneration stage including a boiling and steam stripping column and therein reducing the pressure on said solution to a pressure in the vicinity of atmospheric and substantially below the pressure in said absorption column and thereafter subjecting the hot decompressed solution without any substantial intermediate cooling to boiling and steam stripping in a countercurrent manner in said boiling and steam stripping column at a pressure which corresponds to solution boiling temperatures ranging from 175° F. to 285° F. and thereafter recycling the regenerated solution to said absorption column and therein absorbing said acidic gases at a temperature within said range of from 175° F. to 285° F. and not more than 55° F. below the temperature of the solution leaving the regeneration column.

2. A method in accordance with claim 1 in which said scrubbing solution is an aqueous solution of potassium carbonate.

3. A method in accordance with claim 1 in which said absorption column is maintained at a pressure of at least 100 lbs. per square inch gage.

4. A method in accordance with claim 1 in which the solution is subjected to boiling and steam stripping under a pressure corresponding to solution boiling temperatures ranging from 195° F. to 250° F.

5. A method in accordance with claim 1 in which the regenerated solution is recycled to the absorption column at a temperature not more than 40° F. below the temperature of the solution leaving the regeneration column.

6. A method in accordance with claim 1 in which a minor portion of the stream of regenerated solution from the boiling and steam stripping operation is separately cooled down to a temperature below that of the major portion while avoiding solution temperatures below which the dissolved salts precipitate from solution, said minor portion being separately introduced into the top portion of the absorption column while said major portion is separately introduced into the absorption column at an intermediate level thereof.

7. A method in accordance with claim 1 in which a minor portion of the solution is subjected to more thorough regeneration than the major portion, said minor more thoroughly regenerated portion of the solution being introduced into the upper portion of the absorption column, while the major less thoroughly regenerated portion of the solution is introduced into the absorption column at an intermediate level thereof.

8. A method in accordance with claim 1 in which a minor portion of the scrubbing solution is subjected to more thorough regeneration than the major portion and is then cooled down to a temperature below the temperature of said major portion while avoiding solution temperatures below which the dissolved salts precipitate from solution, said cooled, more thoroughly regenerated minor portion being introduced into the top portion of the absorption column, while the major, less thoroughly regenerated portion is introduced into the absorption column at an intermediate level thereof.

9. A method for removing slightly acidic gases selected from the group consisting of $CO_2$ and $H_2S$ from a gas mixture containing at least one of these gases, said method involving the use of a scrubbing solution which is continuously recycled between an absorption column and a regeneration column and comprising the steps of contacting the gas mixture in an absorption column maintained at a superatmospheric pressure of at least 50 lbs. per square inch gage with a scrubbing solution comprising an aqueous solution of an alkaline reagent selected from the group consisting of alkali metal carbonates, alkali metal phosphates, and alkanolamines, conducting the solution from said absorption column containing absorbed gases to a regeneration stage including a primary and secondary boiling and steam stripping column and therein reducing the pressure on said solution to a pressure in the vicinity of atmospheric and substantially below that of said absorption column and thereafter subjecting the hot decompressed solution without any substantial intermediate cooling to boiling and steam stripping in a countercurrent manner in said primary boiling and steam stripping column under a pressure which corresponds to solution boiling temperatures ranging from 175° F. to 285° F., conducting a minor portion of the stream of solution from the primary boiling and steam stripping column to said secondary boiling and steam stripping column, more completely regenerating said minor portion by subjecting it to an additional boiling and steam stripping operation at a pressure and corresponding boiling temperature greater than the pressure and corresponding boiling temperature in the primary boiling and steam stripping operation, reducing the temperature of said minor portion to at least about as low as the temperature of the major portion leaving the primary boiling and steam stripping column while avoiding solution temperatures below which the dissolved salts precipitate from solution, and then recycling said minor portion separately to the top of the absorption column while recycling the less thoroughly regenerated major portion separately to an intermediate level in the absorption column and therein absorbing the major portion of said acidic gases within said temperature range of from 175° F. to 285° F. and not more than 55° F. below temperature of the solution leaving regeneration column.

10. A method in accordance with claim 9, in which the steam utilized in the secondary boiling and steam stripping operation is thereafter utilized in the primary boiling and steam stripping operation.

11. A method in accordance with claim 9, in which substantially all of the steam required in the primary boiling and steam stripping operation is first used in the secondary boiling and steam stripping operation.

12. A method in accordance with claim 9, in which the temperature of said minor stream leaving the secondary boiling and steam stripping operation is reduced by reducing the pressure on said stream, thereby permitting the evolution of steam therefrom, said evolved steam being utilized as stripping steam in the primary boiling and steam stripping operation.

13. A method in accordance with claim 1 in which hot regenerated scrubbing solution leaving the regeneration column is conducted to a zone of reduced pressure whereby steam is evolved from said solution, said evolved steam being employed to steam strip scrubbing solution containing absorbed gases to remove such gases therefrom.

14. A method for removing slightly acidic gases selected from the group consisting of $CO_2$ and $H_2S$ from a gas mixture containing at least one of these gases, said method involving the use of a scrubbing solution which is continuously recycled between an absorption column and a regeneration column and comprising the steps of contacting the gas mixture in an absorption column maintained at a superatmospheric pressure of at least 50 lbs. per square inch gage with a scrubbing solution comprising an aqueous solution of an alkaline reagent selected from the group consisting of alkali metal carbonates, alkali metal phosphates, and alkanolamines, conducting the solution from said absorption column containing the absorbed gases to a regeneration stage including a boiling and steam stripping column and therein reducing the pressure on said solution to a pressure in the vicinity of atmospheric and substantially below the pressure in said absorption column and thereafter subjecting the hot decompressed solution without any substantial cooling to boiling and steam stripping in a countercurrent manner in said boiling and steam stripping column at a pressure which corresponds to solution boiling temperatures ranging from 175° F. to 285° F., reducing the pressure over the hot regenerated solution leaving said regeneration column, thereby causing the evolution of steam therefrom and some cooling of said solution, but avoiding solution temperature below which the dissolved salts precipitate from solution compressing said evolved steam and employing said compressed steam to steam strip the scrubbing solution, and recycling the regenerated solution to said absorption column and therein absorbing said acidic gases at a temperature within said range of 175° F. to 285° F. and not more than 55° F. below the temperature of the solution leaving the boiling and steam stripping column.

15. A method in accordance with claim 14 in which the pressure reduction over the solution and the compression of the steam evolved thereby is carried out by means of a thermocompressor supplied with relatively high pressure motive steam, said high pressure motive steam serving both to reduce the pressure over the solution and to raise the pressure of the relatively low pressure steam evolved from said solution, the mixture of motive steam and steam evolved from said solution being employed in said regeneration column to effect steam stripping of scrubbing solution containing absorbed gases to remove such gases therefrom.

16. A method in accordance with claim 14 in which the hot regenerated solution is divided into major and minor portions, said minor portion being conducted to a zone of reduced pressure thereby causing the evolution of steam from the said solution and some cooling thereof but avoiding solution temperatures below which the dissolved salts precipitate from solution, said evolved steam being compressed and then employed to steam strip the scrubbing solution, the thus cooled minor portion being recycled to the top portion of the absorber column, while said major portion is recycled to the absorber column at an intermediate level thereof.

17. A method for removing slightly acidic gases selected from the group consisting of $CO_2$ and $H_2S$ from a gas mixture containing at least one of these gases, said method involving the use of a scrubbing solution which is continuously recycled between an absorption column and a regeneration column and comprising the steps of contacting the gas mixture in an absorption column maintained at a superatmospheric pressure of at least 100 lbs. per square inch gage with a scrubbing solution comprising an aqueous solution of potassium carbonate, conducting the solution from said absorption column containing absorbed gases to a regeneration stage including a boiling and steam stripping column and therein reducing the pressure on the solution to a pressure in the vicinity of atmospheric and substantially below the pressure in said absorption column and thereafter subjecting the hot decompressed solution without any substantial intermediate cooling to boiling and steam stripping in a countercurrent manner in said boiling and steam stripping column at a pressure which corresponds to solution boiling temperatures ranging from 195° F. to 250° F. and thereafter recycling the regenerated solution to said absorption column and therein absorbing said acidic gases at a temperature within said range of from 195° F. to 250° F. and not more than 40° F. below the temperature of the solution leaving the boiling and steam stripping column.

18. A method for removing slightly acidic gases selected from the group consisting of $CO_2$ and $H_2S$ from a gas mixture containing at least one of these gases, involving the use of a scrubbing solution which is continuously recycled between an absorption stage and a regeneration stage, said method comprising the steps of contacting the gas mixture in an absorption column maintained at a superatmospheric pressure of at least 50 lbs. per square inch gage with a scrubbing solution comprising an aqueous solution of an alkaline reagent selected from the group consisting of alkali metal carbonates, alkali metal phosphates, and alkanolamines and which is at a temperature of from 175° F. to 285° F., conducting the hot solution from said absorption column containing absorbed gases to a regeneration stage including a boiling and steam stripping column and therein reducing the pressure on said solution to a pressure in the vicinity of atmospheric and substantially below the pressure in said absorption column and thereafter subjecting the entire hot decompressed solution without any substantial intermediate cooling to boiling and steam stripping in a countercurrent manner in said boiling and steam stripping column while maintaining said column at a pressure which corresponds to a solution boiling temperature ranging from 175° F. to 285° F. and thereafter recycling the entire regenerated solution to said absorption column at a temperature within said range of from 175° F. to 285° F. but not however, at a temperature more than 55° F. below the temperature of the solution leaving the regeneration column.

References Cited in the file of this patent

UNITED STATES PATENTS

| | | | |
|---|---|---|---|
| 960,788 | Behrens | June 7, | 1910 |
| 2,318,522 | Powell | May 4, | 1943 |
| 2,368,600 | Rosenstein | Jan. 30, | 1945 |
| 2,477,314 | Scharmann | July 26, | 1949 |
| 2,615,787 | Randlett | Oct. 28, | 1952 |